L. TOPANI.
AUTOMOBILE SLEIGH.
APPLICATION FILED MAY 5, 1916.
1,203,077.
Patented Oct. 31, 1916.
4 SHEETS—SHEET 3.
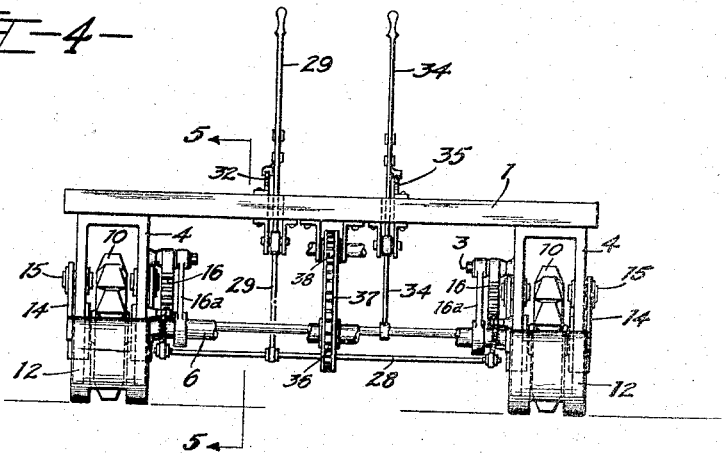
FIG-4-
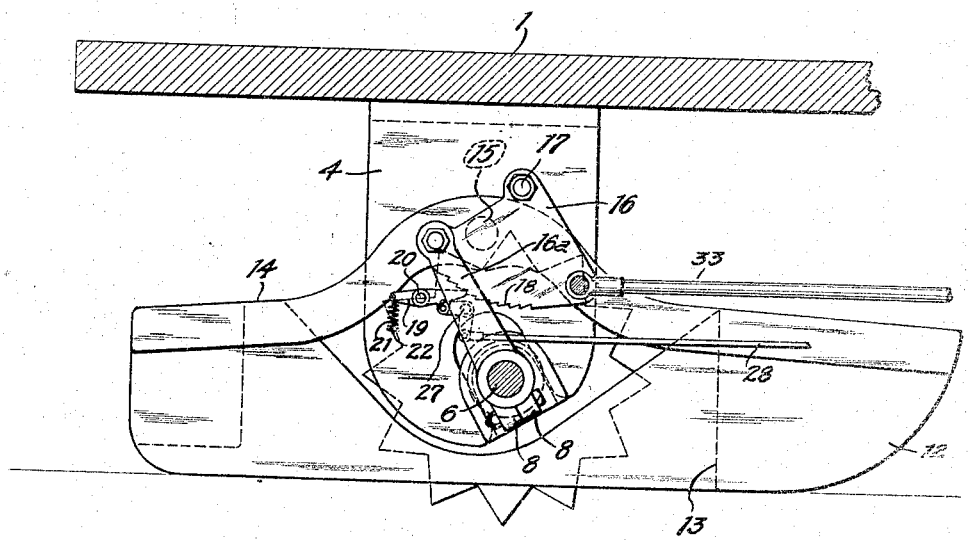
FIG-5-
WITNESSES:
Thomas J. Magan.
Paul A. Niersen
INVENTOR
L. Topani
BY
H. J. Sanders
ATT'Y.

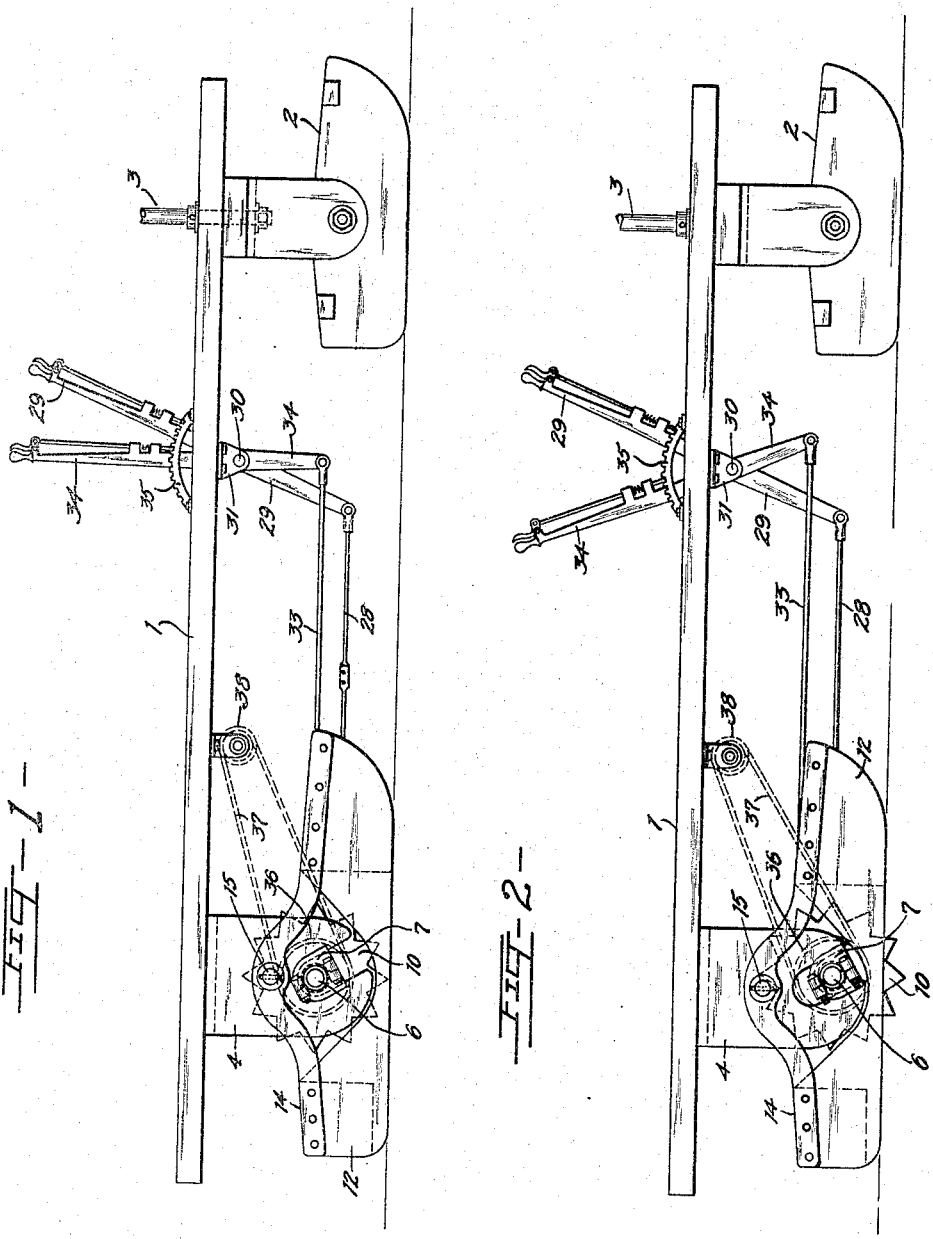

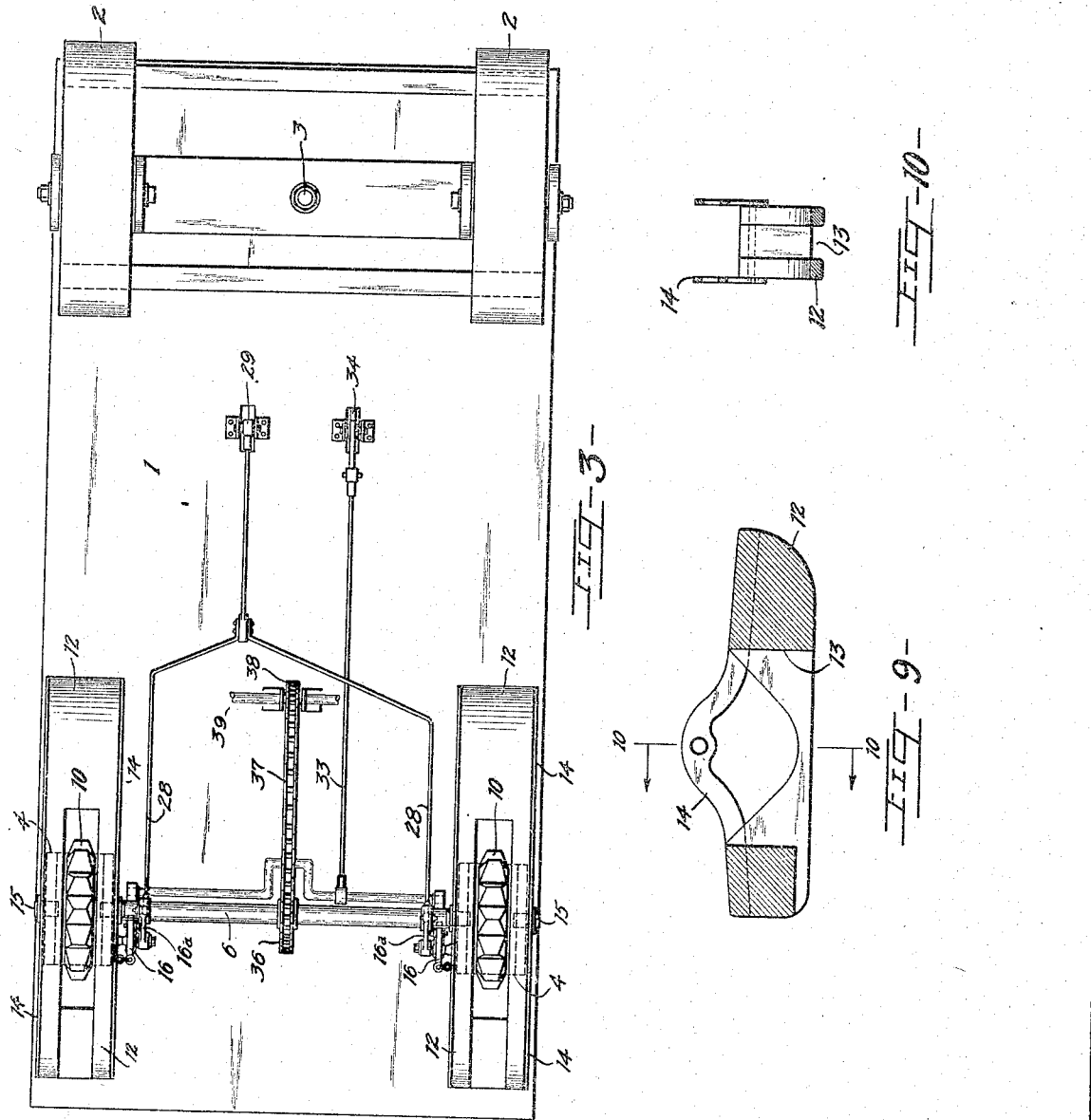

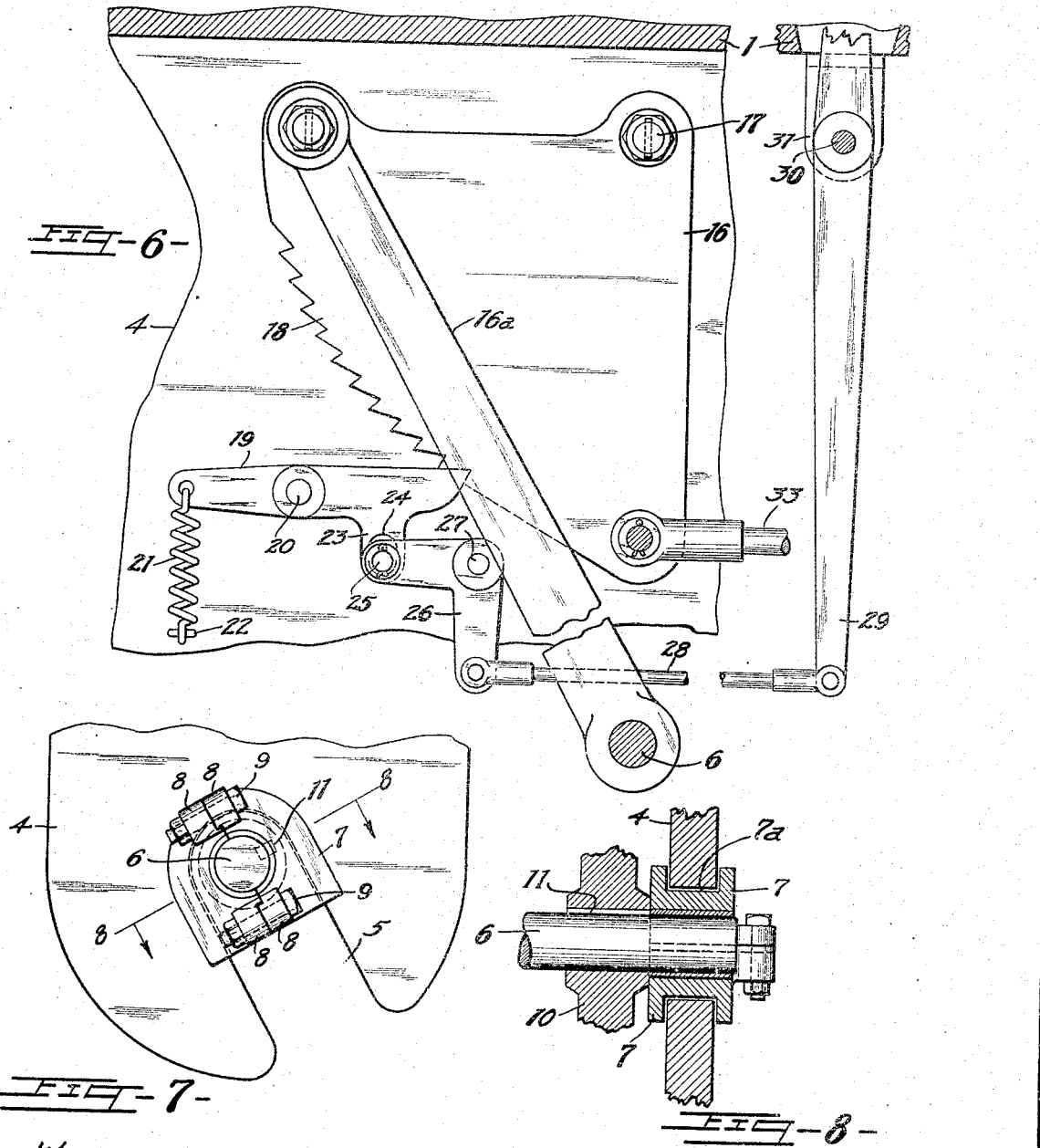

UNITED STATES PATENT OFFICE.

LAURI TOPANI, OF HANCOCK, MICHIGAN.

AUTOMOBILE SLEIGH.

1,203,077.

Specification of Letters Patent.

Patented Oct. 31, 1916.

Application filed May 5, 1916. Serial No. 95,689.

*To all whom it may concern:*

Be it known that I, LAURI TOPANI, a citizen of the United States, residing at Hancock, in the county of Houghton, in the State of Michigan, have invented certain new and useful Improvements in Automobile Sleighs, of which the following is a specification.

This invention relates to automobile sleighs of a type wherein slotted runners are employed and rotary spur wheels or drive wheels are operatively arranged in the slotted portions of the runners.

One object is to provide novel means for raising and lowering the said spur wheels with relation to the runners to adapt the propelling mechanism to snow or ice covered roadways.

With the foregoing and other objects in view the invention consists in the combination and arrangement of parts as will be hereinafter more definitely pointed out and claimed, reference being had to the accompanying drawings, wherein—

Figure 1 is a side elevation of my automobile sleigh with the drive wheels in raised position for operation over ice covered roads. Fig. 2 is a similar view with the drive wheels lowered for operation over roads having a covering of soft or new fallen snow. Fig. 3 is an inverted plan view of the sleigh. Fig. 4 is a rear view. Fig. 5 is an enlarged fragmentary view of Fig. 4 but with the drive wheels in an altered position and it is taken on line 5—5 of Fig. 4. Fig. 6 is an enlarged detail view of the means employed for raising and lowering the drive wheels. Fig. 7 is an enlarged detail view of the sliding bearing employed. Fig. 8 is a section taken on line 8—8 of Fig. 7. Fig. 9 is a longitudinal sectional view through one of the runners. Fig. 10 is a cross section on line 10—10 of Fig. 9.

Like reference characters denote corresponding parts throughout the several views.

The reference numeral 1 denotes the frame of the sleigh having the ordinary front or steering runners 2 controlled by the steering post 3. To the under side of the rear end of the frame 1 the yokes 4 are secured that are formed, at their lower ends, with the oblique slots 5 to receive the rear axle 6 that is adjustable with relation to said yokes and that is journaled in split bearings comprising the bearing-sections 7, 7 having ears 8 to receive the locking bolts 9. The split bearings have peripheral grooves 7$^a$ to support the yokes 4 upon the shaft 6 as clearly shown in Fig. 8 of the drawings. Spur drive wheels 10 are fastened by keys 11 to the said shaft 6 within the yokes 4. The rear runners 12 are formed with longitudinal slots 13 and with the metallic bands 14 that are bent upward at approximately the longitudinal center of the said runners and are connected by pivots 15 to the said yokes 4; the longitudinally slotted portions of said runners 12 receiving the spur drive wheels 10.

To the inner faces of the yokes 4 cam shaped racks 16 are secured by pivots 17, each rack having teeth 18 for engagement with a pawl 19 connected by pivot 20 to the yoke 4 and connected at one end by spring 21 to a screw eye 22 which is secured to the face of the yoke 4. The said pawl is formed with an offset 23 formed with an elongated slot 24 through which a pin 25 passes that is carried at one end of the lever 26 pivoted at 27 to said yoke and connected by pitman 28 to a lever 29 fulcrumed upon a pin 30 carried by casting 31 secured to the under surface of the frame 1, said lever working over a segment 32 carried by the said frame 1. Referring again to the rack 16 the same is connected by arm 16$^a$ to rear axle 6 and by pitman 33 to a lever 34, also fulcrumed upon the pin 30, that works over segment 35 also carried by the frame 1.

The operation of the mechanism is as follows: Taking the mechanism in the position illustrated in Fig. 1, the spur drive wheels being raised, the operator may lower them by moving the lever 29 into the position illustrated in Fig. 2, or toward the rear of the frame 1, thus causing the pitman 28 to move the bell crank lever in a direction to tilt the pawl 19, against the tension of spring 21, out of engagement with the rack 16. The lever 34 is then released from the segment 35 when it may be moved in a backward direction also thus causing the pitman 33 to move the rack 16 forward or in a direction to lower the arm 16$^a$ together with the rear axle 6 and the spur drive wheels 10 and when adjusted to the position desired they may be again locked in such position by reversing the lever 29 and so throwing the pawl 19 and rack 16 again into engagement. Rotation of the axle 6 is effected through the medium of a sprocket wheel 36 fast thereon and connected by chain 27 with the wheel 38 of the drive shaft 39 driven directly by a suitable motor (not shown).

What is claimed is:—

1. In an automobile sleigh, a frame, longitudinally slotted runners, yokes carried by said frame and formed with oblique slotted portions, pivotal connection between said runners and said yokes, a transverse power driven rear axle, drive wheels keyed to said axle, split bearings, for said axle, formed with peripheral grooves to receive the said yokes, racks pivotally secured to the relatively inner faces of said yokes, connection between said racks and said rear axle, locking pawls carried by said yokes for engagement with said racks, manually operable release means for said pawls and manually operable means for moving said racks upon their pivots when said racks are disengaged from said pawls.

2. In an automobile sleigh, a frame, longitudinally slotted runners, yokes carried by said frame and formed with obliquely slotted portions, pivotal connection between said runners and said yokes, a power driven rear axle, spur drive wheels keyed to said axle, split bearings for said axle formed with peripheral grooves for adjustable supporting engagement with said yokes, cam-shaped racks pivotally secured to the relatively inner faces of said yokes, connection between said racks and the said axle, locking pawls carried by said yokes for engagement with said racks, manually operable release means for said pawls and manually operable means for moving said racks upon their pivots when said racks are disengaged from said pawls.

In testimony that I claim the foregoing as my own I have hereto affixed my signature in the presence of two subscribing witnesses.

LAURI TOPANI.

Witnesses:
 JOHN KIISHILA,
 HENRY NORMAN.

Copies of this patent may be obtained for five cents each, by addressing the "Commissioner of Patents, Washington, D. C."